United States Patent
Zhao

(10) Patent No.: US 11,250,551 B2
(45) Date of Patent: Feb. 15, 2022

(54) DEVICES, SYSTEMS, AND METHODS FOR LIMITED-SIZE DIVISIVE CLUSTERING

(71) Applicant: Canon Virginia, Inc., Newport News, VA (US)

(72) Inventor: Yunzhe Zhao, Irvine, CA (US)

(73) Assignee: Canon Virginia, Inc., Newport News, VA (US)

( * ) Notice: Subject to any disclaimer, the term of this patent is extended or adjusted under 35 U.S.C. 154(b) by 17 days.

(21) Appl. No.: 16/830,080

(22) Filed: Mar. 25, 2020

(65) Prior Publication Data

US 2020/0311904 A1    Oct. 1, 2020

Related U.S. Application Data

(60) Provisional application No. 62/825,378, filed on Mar. 28, 2019.

(51) Int. Cl.
    *G06T 7/00* (2017.01)
    *G06K 9/62* (2022.01)

(52) U.S. Cl.
    CPC .......... *G06T 7/0002* (2013.01); *G06K 9/6202* (2013.01); *G06K 9/6218* (2013.01)

(58) Field of Classification Search
    None
    See application file for complete search history.

(56) References Cited

U.S. PATENT DOCUMENTS

| | | | |
|---|---|---|---|
| 5,544,256 A * | 8/1996 | Brecher | ............... G06T 7/0006 382/149 |
| 8,203,560 B2 | 6/2012 | Cohen | |
| 9,020,271 B2 | 4/2015 | Deolalikar | |
| 10,019,649 B2 | 7/2018 | Curington | |
| 2005/0114382 A1 | 5/2005 | Lakshminarayan | |
| 2006/0233434 A1* | 10/2006 | Hamamatsu | ............ G06K 9/38 382/149 |

OTHER PUBLICATIONS

Rui Xu, Survey of Clustering Algorithms, IEEE Transactions on Neural Networks, vol. 16, No. 3, May 2005.
Jaekyu Ha et al., Recursive X-Y Cut using Bounding Boxes of Connected Components, Proceedings of the Third International Conference on Document Analysis and Recognition, Aug. 1995.
David Duvenaud et al., Multiscale Conditional Random Fields for Semi-supervised Labeling and Classification, Canadian Conference on Computer and Robot Vision, May 2011.
Christophoros Nikou, Segmentation by Clustering, Dec. 2013.

* cited by examiner

*Primary Examiner* — Leon Flores
(74) *Attorney, Agent, or Firm* — Canon U.S.A., Inc. IP Division

(57) ABSTRACT

Some embodiments of devices, systems, and methods generate a respective connection mask at each defect detection location in a binary defect map, wherein each detection location in the binary defect map has a value that indicates that the detection location either has a defect or, alternatively, does not have a defect; generate one or more clusters of defect detection locations in the binary defect map based on each defect location's respective connection mask and on the binary defect map; generate respective bounding boxes for the one or more clusters; and recursively perform the following: checking respective sizes of the bounding boxes, and splitting any clusters of the one or more clusters that have respective bounding boxes with sizes that exceed one or more thresholds, thereby generating additional clusters of defect locations.

18 Claims, 12 Drawing Sheets

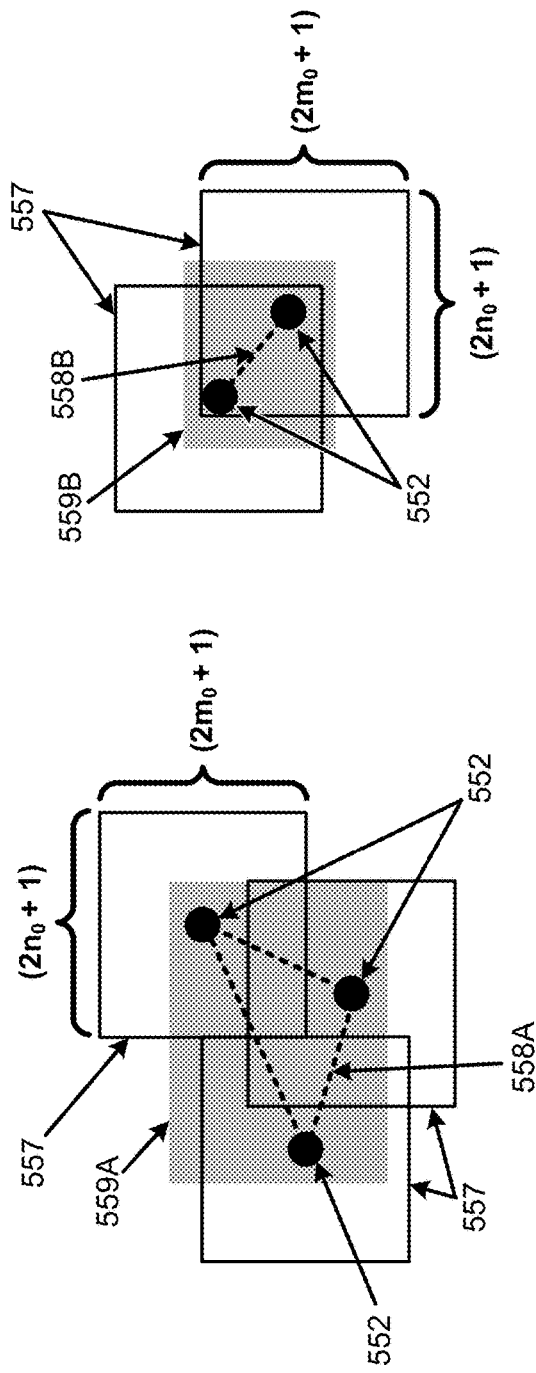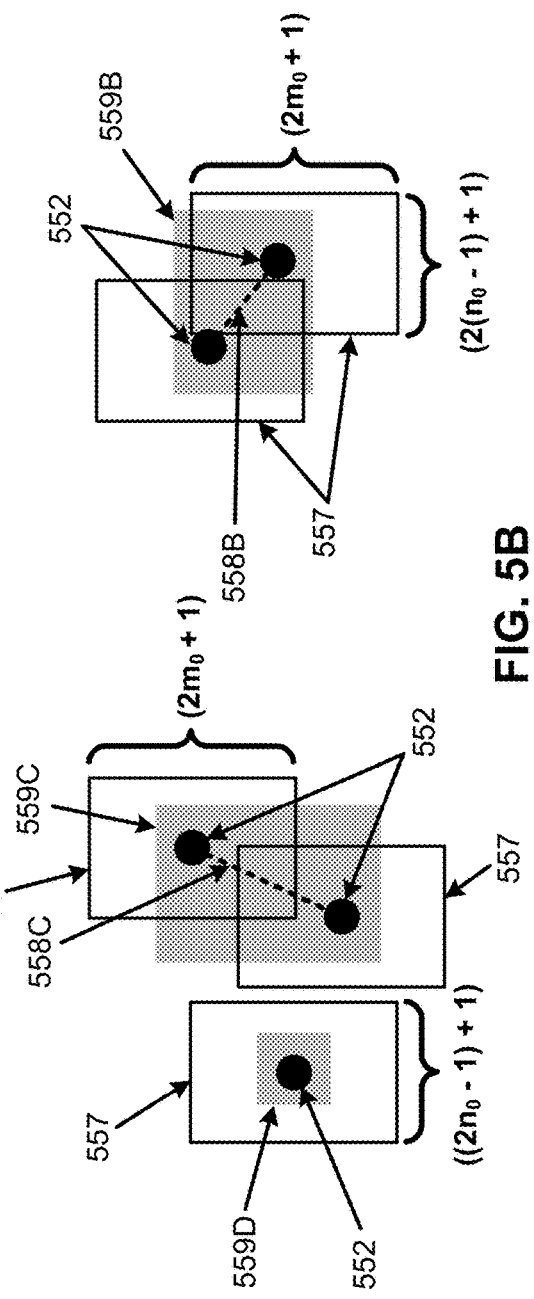
FIG. 5A
FIG. 5B

DEVICES, SYSTEMS, AND METHODS FOR LIMITED-SIZE DIVISIVE CLUSTERING

CROSS-REFERENCE TO RELATED APPLICATIONS

This application claims the benefit of U.S. Application No. 62/825,378, which was filed on Mar. 28, 2019.

BACKGROUND

Technical Field

This application generally concerns detecting anomalies in images.

Background

Nondestructive testing techniques are used to examine the properties of objects without causing damage to the objects. These techniques can be used in a quality-control process to identify defects in the object.

SUMMARY

Some embodiments of a device comprise one or more computer-readable storage media and one or more processors. The one or more processors are configured to cause the device to perform operations that include generating a respective connection mask at each defect detection location in a binary defect map, wherein each detection location in the binary defect map has a value that indicates that the detection location either has a defect or, alternatively, does not have a defect; generating one or more clusters of defect detection locations in the binary defect map based on each defect location's respective connection mask and on the binary defect map; generating respective bounding boxes for the one or more clusters; and recursively performing the following: checking respective sizes of the bounding boxes, and splitting any clusters of the one or more clusters that have respective bounding boxes with sizes that exceed one or more thresholds, thereby generating additional clusters of defect locations.

Some embodiments of a method comprise obtaining a defect map, wherein each detection location in the defect map has either a value that indicates that the detection location has a defect or, alternatively, a value that indicates that the detection location does not have a defect; generating a respective connection mask at each detection location in the defect map; generating one or more clusters of defect detection locations in the defect map based on each defect detection location's respective connection mask and on the binary defect map; generating a respective bounding box for each of the one or more clusters of defect detection locations; identifying a bounding box of the respective bounding boxes that exceeds a size threshold; decreasing a distance tolerance of the connection masks of the defect detection locations in the cluster that corresponds to the bounding box, thereby generating first smaller connection masks; generating one or more first additional clusters of defect detection locations from the defect detection locations in the cluster that corresponds to the bounding box based on the first smaller connection masks; and generating a respective first bounding box for each of the one or more first additional clusters of defect detection locations.

Some embodiments of one or more computer-readable storage media store instructions that, when executed by one or more computing devices, cause the one or more computing devices to perform operations that comprise generating a respective connection mask at each defect detection location in a binary defect map, wherein each detection location in the binary defect map has a value that indicates that the detection location either has a defect or, alternatively, does not have a defect; generating one or more clusters of defect detection locations in the binary defect map based on each defect location's respective connection mask and on the binary defect map; generating respective bounding boxes for the one or more clusters; and recursively performing the following: checking respective sizes of the bounding boxes, and splitting any clusters of the one or more clusters that have respective bounding boxes with sizes that exceed one or more thresholds, thereby generating additional clusters of defect locations.

BRIEF DESCRIPTION OF THE DRAWINGS

FIG. 5A illustrates example embodiments of connection masks.

FIG. 5B illustrates example embodiments of connection masks.

DESCRIPTION

The following paragraphs describe certain explanatory embodiments. Other embodiments may include alternatives, equivalents, and modifications. Additionally, the explanatory embodiments may include several novel features, and a particular feature may not be essential to some embodiments of the devices, systems, and methods that are described herein.

Figure 1:
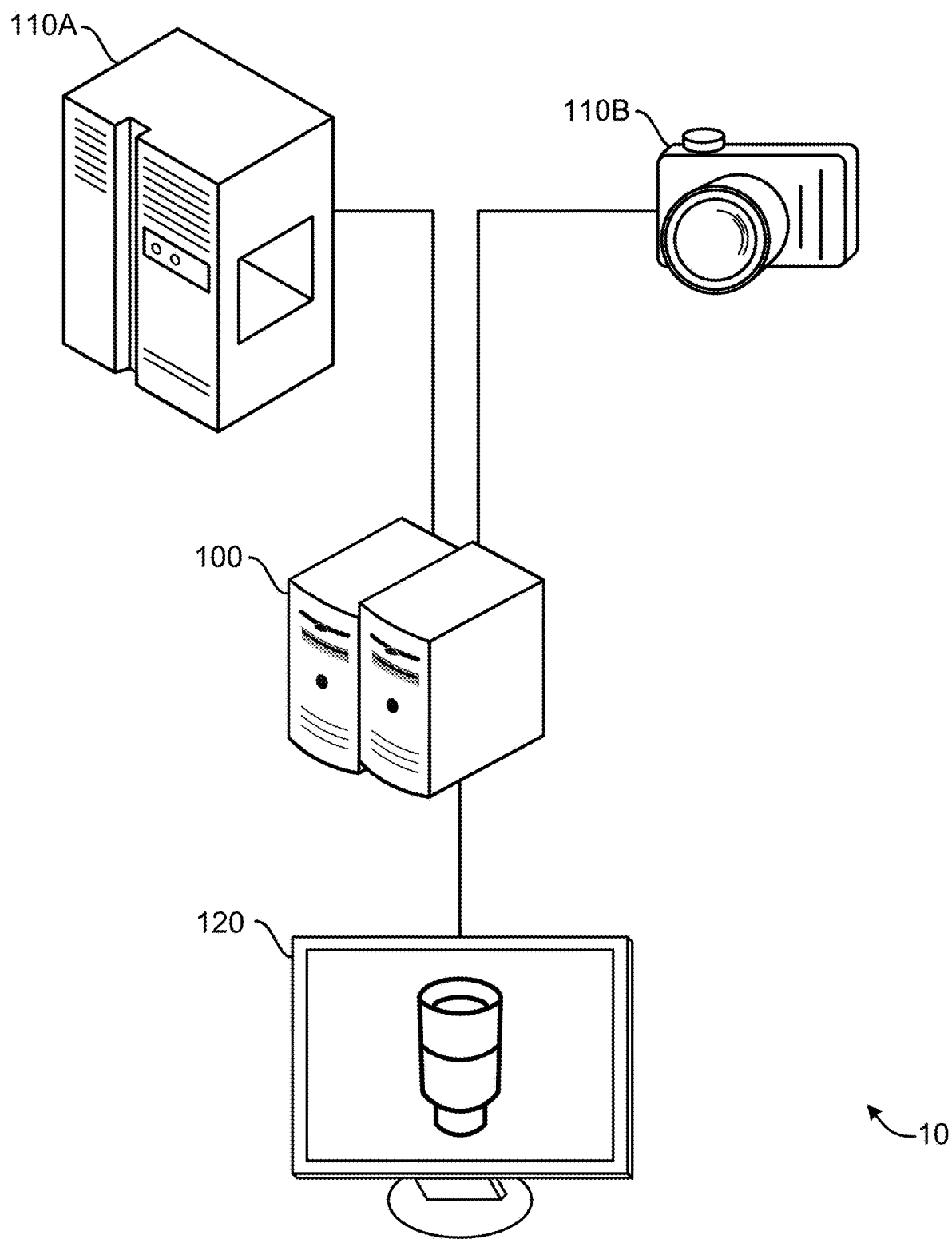
FIG. 1 illustrates an example embodiment of a system for anomaly clustering.

FIG. 1 illustrates an example embodiment of a system for anomaly clustering. The system 10 includes one or more clustering devices 100, which are specially-configured computing devices; one or more image-capturing devices, such as an x-ray detector 110A or a camera 110b; and at least one display device 120.

The system 10 detects anomalies in images (e.g., x-ray images) by generating a respective anomaly score for the detection areas in an image and then detecting anomalies based on the anomaly scores. Also, an anomaly in an image of an object may indicate a defect in the object. In some embodiments, each detection area is a voxel, a group of pixels (e.g., a patch in the image), or a single pixel, for example as described in U.S. Pat. No. 10,410,084 or in U.S. application Ser. No. 16/678,880.

An anomaly in an object may be shown by several pixels in the image. In some pixel-based embodiments of the anomaly detection (e.g., embodiments in which a detection area is a single pixel), each pixel in the image will be labelled as "no defect" or "defect" with a confidence score (e.g., the anomaly score may be used as the confidence score). Image-segmentation operations can be used to connect pixels and classify the defect regions based on each of these pixel's "defect" label and confidence score. In some embodiments of the system 10, to segment the defect regions from the background (e.g., the non-defect regions), location-based clustering is used to cluster these neighborhood defect pixels based on their distances from each other. Also, each cluster may be surrounded by a respective bounding box.

In some embodiments of the system 10, the clusters or bounding boxes have size constraints. For example, in some embodiments, the size of each cluster should not exceed several pixels in radius, or the bounding box of each cluster should not exceed several pixels in width and several pixels in height. Some embodiments of the system 10 perform iterative (e.g., recursive) shrinking and splitting operations that include these constraints as iterative (e.g., recursive) conditions and that generate clusters that best represent the defect regions and that have bounding boxes that comply with the size constraints.

Figure 2:
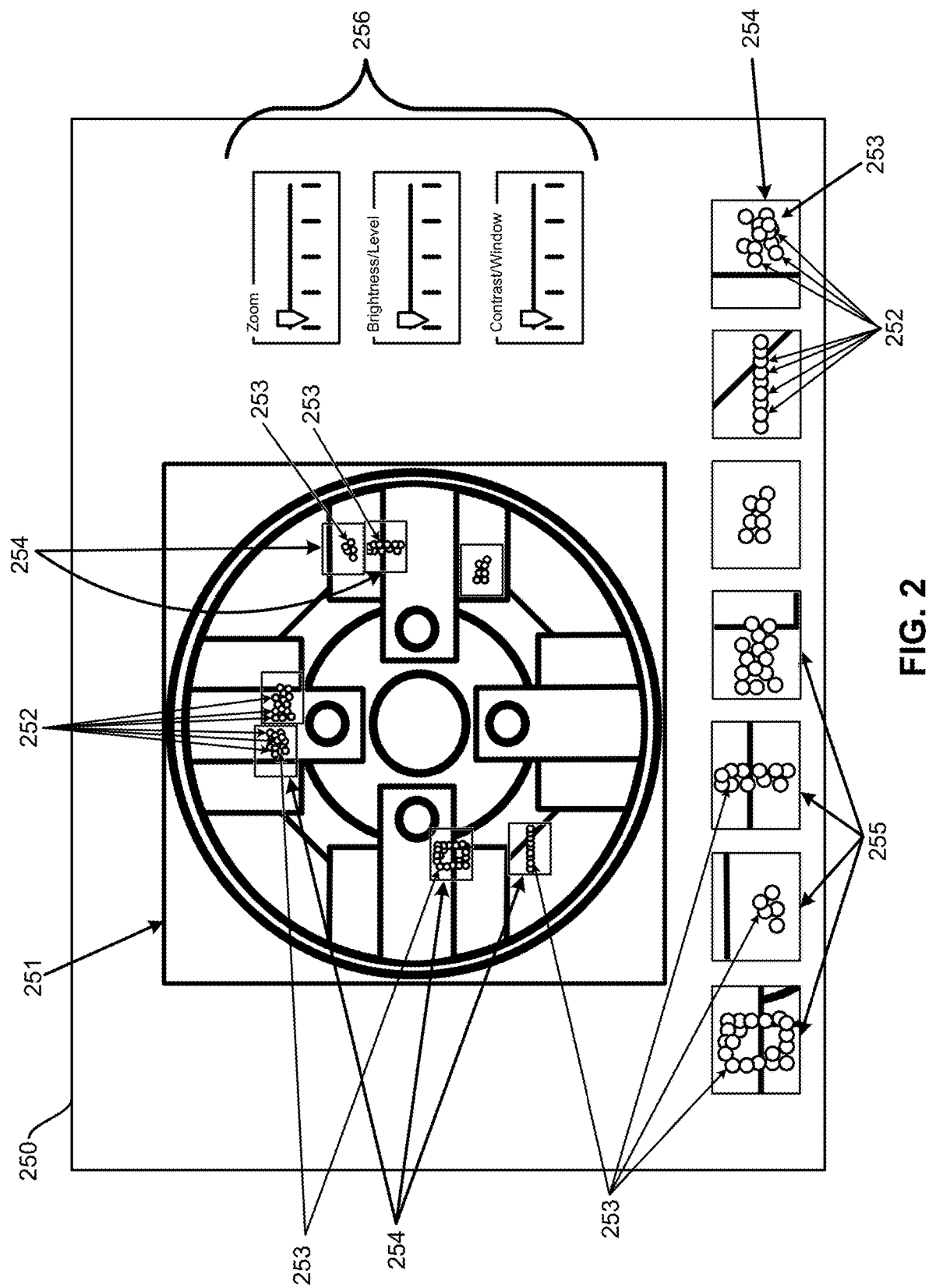
FIG. 2 illustrates an example embodiment of a user interface.

FIG. 2 illustrates an example embodiment of a user interface, which is generated by one or more clustering devices or other specially-configured computing devices. The user interface 250 may be displayed by a display device (e.g., the display device 120 in FIG. 1). The user interface 250 displays an image 251, which shows an object. The user interface 250 also shows defect areas 252, which are detection areas I the image 251 where an anomaly (e.g., a defect) has been detected. The one or more clustering devices 100 also select defect areas 252 to organize together into clusters 253 and generate a respective bounding box 254 for each cluster 253 of defect areas 252.

Additionally, the user interface includes bounding-box images 255 (e.g., thumbnails), each of which shows the area in a respective bounding box 254. As shown in FIG. 2, the bounding-box images 255 may show zoomed-in views of the clusters 253 that are in the bounding boxes 254. The user interface 250 also includes user controls 256.

To control the sizes of the bounding-box images 255, for example to make the bounding-box images 255 large enough to provide a readily visible zoomed-in view of the clusters 253 of defect areas 252, the user interface 250 may constrain the sizes of the clusters 253 of defect areas 252, of the bounding boxes 254, or both.

Figure 3:
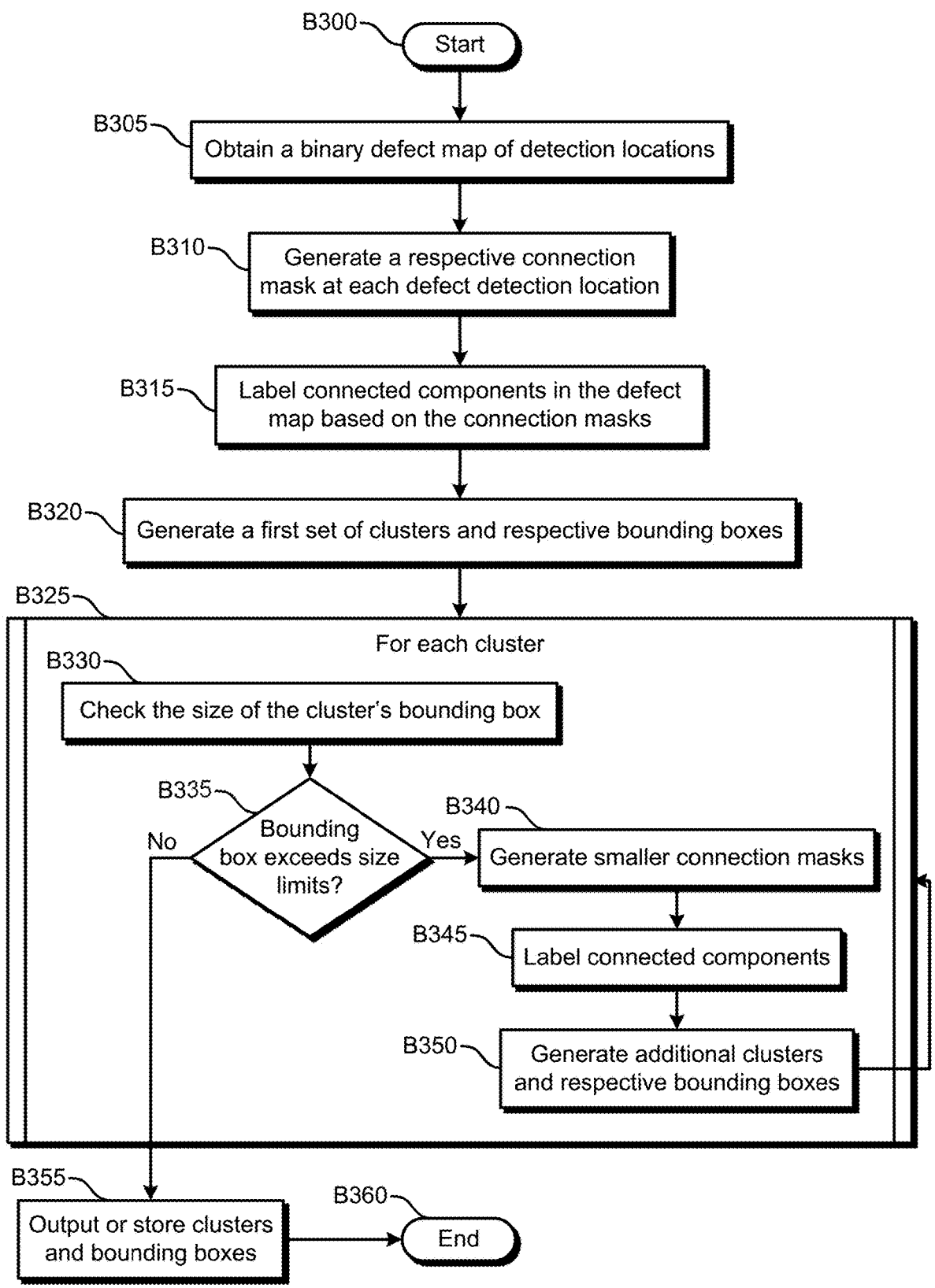
FIG. 3 illustrates an example embodiment of an operational flow for anomaly clustering.

FIG. 3 illustrates an example embodiment of an operational flow for anomaly clustering. Although this operational flow and the other operational flows that are described herein are each presented in a certain respective order, some embodiments of these operational flows perform at least some of the operations in different orders than the presented orders. Examples of different orders include concurrent, parallel, overlapping, reordered, simultaneous, incremental, and interleaved orders. Also, some embodiments of these operational flows include operations (e.g., blocks) from more than one of the operational flows that are described herein. Thus, some embodiments of the operational flows may omit blocks, add blocks (e.g., include blocks from other operational flows that are described herein), change the order of the blocks, combine blocks, or divide blocks into more blocks relative to the example embodiments of the operational flows that are described herein.

Furthermore, although this operational flow and the other operational flows that are described herein are performed by a clustering device, some embodiments of these operational flows are performed by two or more clustering devices or by one or more other specially-configured computing devices.

The operational flow in FIG. 3 starts in block B300 and then moves to block B305, where the clustering device obtains (e.g., generates) a binary defect map of the detection areas in an image. In binary defect map, each detection location can have one of two values: either a "defect" value or a "non-defect" value. For example, in some embodiments of a binary defect map in which each detection area is a respective pixel, either the value "defect" or "non-defect" is assigned to each pixel, and the binary values are arranged in the same locations as their corresponding pixels. Also for example, 1 and 0 may be used in the binary defect map to respectively represent "defect" and "non-defect" values.

Figure 4A:
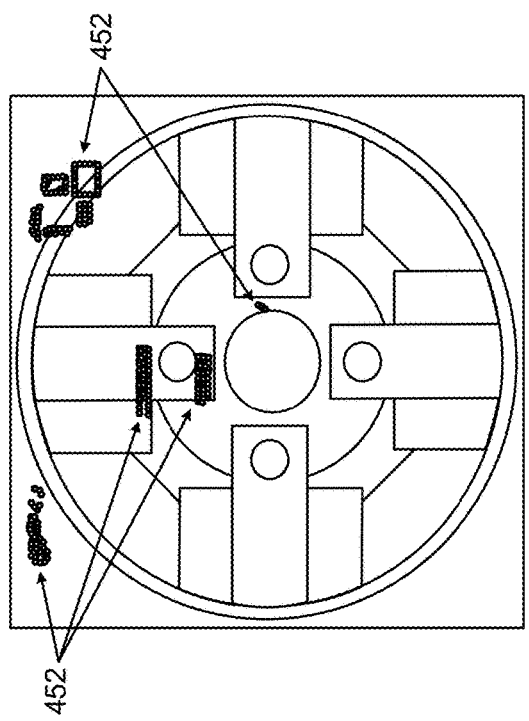
FIG. 4A illustrates an example embodiment of an image in which "defect" pixels have been marked.
Figure 4D:
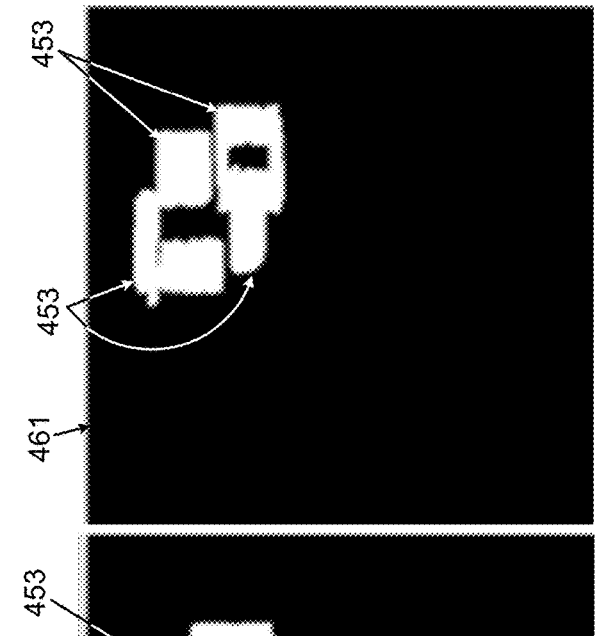
FIG. 4D illustrates an example embodiment of a binary defect map.
Figure 4C:
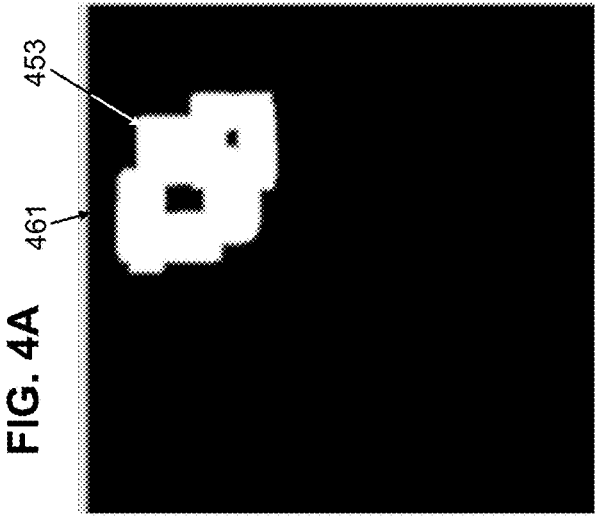
FIG. 4C illustrates an example embodiment of a binary defect map.
Figure 4B:
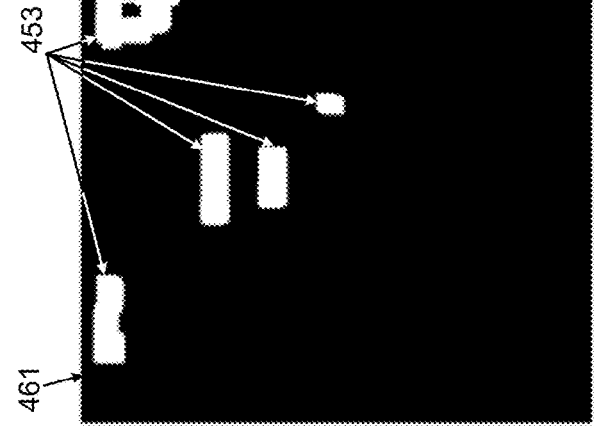
FIG. 4B illustrates an example embodiment of a binary defect map.

Additionally, FIG. 4A illustrates an example embodiment of an image in which defect pixels 452 have been marked, and FIGS. 4B-D illustrate example embodiments of binary defect maps 461 that were generated based on the image and the defect pixels 452 in FIG. 4A. In FIGS. 4B-D, defect pixels are marked with white dots. For example, to generate a binary defect map 461, the clustering device may obtain an anomaly-score image in which the value of each pixel in the anomaly-score image is the pixel's respective anomaly score. Based on the anomaly scores, the clustering device may assign either "defect" or "non-defect" to each pixel. The clustering device may then represent each defect pixel with a 1 (e.g., the white dots in FIGS. 4B-D) and represent each non-defect pixel with a 0 (e.g., the black areas in FIGS. 4B-D).

Next, in block B310, the clustering device generates a connection mask at each defect pixel's location based on the defect map. At each defect detection location (e.g., each pixel's location), the clustering device generates a connection mask by expanding a point to a $(2n_0+1) \times (2m_0+1)$ mask, where $n_0$ and $m_0$ are both integers. $2n_0$ is the distance tolerance on the x axis (the width distance tolerance), which means if the distance between two points on the x axis is larger than $2n_0$, then these two points will not be connected. $2m_0$ is the distance tolerance on the y axis (the height distance tolerance), which means if the distance between two points on the y axis is larger than $2m_0$, then these two points will not be connected.

For example, FIGS. 4B-D show connection masks. FIGS. 4C-4D show connection masks of the same defect region with different distance tolerances. Also for example, FIG. 5A illustrates example embodiments of connection masks. In FIG. 5A, each connection mask 557 is centered on a respective defect pixel 552.

The flow then proceeds to block B315, where the clustering device labels connected components, each of which includes one or more "defect" pixels, in the defect map, based on the connection masks. The clustering device may use one or more of various methods for connected component labeling, such as a graph-traversal method. Some graph-traversal methods search the whole binary defect map, find a defect pixel, and then use the connection masks to find and label all the connected defect pixels of this pixel before the searching goes to another pixel. For example, FIG. 5A includes two groups of connected components 558A-B. The first group of connected components 558A includes three "defect" pixels 552, and the second group of connected component 558B includes two "defect" pixels 552.

Next, in block B320, the clustering device generates a first set of clusters of defect pixels (as $C_{01}$, $C_{02}$ . . . ) and their bounding boxes (as $B_{01}$, $B_{02}$ . . . ) based on the connected components. In block B320, the clustering device may cluster all of the defect pixels in each group of connected components into a respective cluster. Also, a bounding box surrounds a respective cluster (surrounds all of the defect pixels in the respective cluster) or, if a defect pixel has not been clustered with any other defect pixels, a respective lone defect pixel. In some embodiments, the smallest size of these bounding boxes is $(2n_0+1) \times (2m_0+1)$ (the size of a connection mask), for example when there is no other defect pixel clustered with (or connected to) the center defect pixel. When there are many defect pixels that are in the same respective group of connected components (e.g., that fall into each other's tolerance distances), a cluster and its bounding box grow larger.

For example FIG. 4B shows clusters 453 that were generated from the defect pixels 452 in FIG. 4A, using $n_0=16$ and $m_0=16$.

Also for example, in FIG. 5A, some embodiment of the clustering device cluster the three defect pixels 552 in the first group of connected components 558A and then generate a first bounding box 559A that surrounds the cluster. Also, some embodiments of the clustering device cluster the two defect pixels 552 in the second group of connected components 558B and then generate a second bounding box 559B that surrounds the cluster. And the first bounding box 559A is larger than the second bounding box 559B.

From block B320 the flow moves to block B325, which includes blocks B330-B350. The clustering device performs the operations in block B325 for each cluster.

In block B330, the clustering device checks the size of the cluster's bounding box. For example, assume that size limits are set to be W in width and H in height. In some embodiments, if the size of the bounding box is smaller than or equal to the size limit in both width W and height H, the corresponding cluster of the bounding box will be defined as a "qualified cluster."

The flow then moves to block B335, where the clustering device determines if the bounding box exceeds the size limits. If the bounding box exceeds the size limits (B335=Yes), then the flow moves to block B340. If the bounding box does not exceed the size limits (B335=No), then the flow moves to block B355.

In block B340, the clustering device generates smaller connection masks for the defect pixels in the bounding box. For example, if the bounding box exceeds the height limit H, the clustering device shrinks the connection mask of each defect pixel in the bounding box to a $(2n_0+1) \times (2m_1+1)$ connection mask, where $m_1=m_0-1$. Thus, the height distance tolerance (on the y axis) changes from $2m_0$ to $2(m_0-1)$. So the heights of these connection masks shrink relative to the connection masks that were generated in block B310 (or generated in previous iterations of block B340). That means, if two pixels have less than $2n_0$ pixels between them on the x axis but are exactly $2m_0$ pixels apart on the y axis, and there are no other defect pixels in between them, by changing the distance tolerance from $m_0$ to $m_0-1$, the two connection masks around the pixels will no longer overlap. Thus, the cluster and the bounding box that surrounded the two pixels will be split. Also, if the bonding box exceeds the width limit W, the clustering device shrinks the connection masks on the x axis (e.g., the width distance tolerance changes from $2n_0$ to $2(n_0-1)$).

For example, FIG. 5B illustrates example embodiments of connection masks, and the connection masks 557 in FIG. 5B have been shrunk relative to the connection masks 557 in FIG. 5A. In this example, the connection masks have been shrunk on the x axis from $2n_0+1$ to $2(n_0-1)+1$ because the first bounding box 559A in FIG. 5A exceeded the width limit W on the x axis. Although the second bounding box 559B does not exceed the width limit, and thus the clustering device may not generate new connection masks for the second bounding box 559B, for a scale reference FIG. 5B also shows the second bounding box 559B with the smaller connection masks.

The flow then moves to block B345, where the clustering device labels connected components in the bounding box based on the connection masks that were generated in block B340. For example, for the two pixels that have less than $2n_0$ pixels between them on the x axis and that are exactly $2m_0$ pixels apart on the y axis, they will no longer belong to the same group of connected components. Also for example, in FIG. 5B, from the three pixels 552 that were previously included in the first bounding box 559A, the clustering device labels a first group of connected components 558C, which includes two of the three pixels 552. The other pixel 552 is no longer a member of a group of connected components.

In block B350, the clustering device generates additional clusters based on the connected components from block B345. For example, for the two pixels that have less than $2n_0$ pixels between them on the x axis and that are exactly $2m_0$ pixels apart on the y axis, these two pixels would fall into separate clusters with different bounding boxes, the sizes of which are smaller than the original bounding box. Also for example, in FIG. 5B, the clustering device generates a cluster that includes the connected components 558C and generates a respective bounding box 559C. And the clustering device generates a cluster that includes only the other pixel 552 (that is no longer part of a group of connected components) and generates a respective bounding box 559D. Bounding boxes 559C-D are each smaller than bounding box 559A in FIG. 5A.

From block B350, the flow returns to block B325. The clustering device performs block B325 for the new clusters and bounding boxes. Thus, the new bounding boxes that still exceed the size limits after block B350 will go through further shrinking and splitting in block B325.

Also, in block B355, the clustering device outputs or stores the information of the "defect" pixels, the clusters, and the bounding boxes that are within the size limits. For example, the clustering device may store or output one or more of the following information about each cluster: location, size, defect pixels, and a confidence level of the cluster, which may be calculated by a weighted average of the defect pixels and their confidence scores.

Finally, the flow ends in block B360.

Thus, some embodiments of the clustering device stop the iterative shrinking and splitting if all the clusters or bounding boxes are within the size limit. Also, some embodiment of the clustering device stop the iterative shrinking and splitting if one or more tolerance distances have been shrunk to a minimum (e.g., 0) but the bounding box that contains the cluster is still larger than the size limit, which means the whole defect cluster is contiguous and cannot be split.

Also, at the end of the operations, every defect pixel belongs to only one cluster (a one-to-one mapping). The bounding box of the cluster is smaller than the size limit unless the cluster is a contiguous defect cluster. For example, FIG. 4C illustrates a cluster 453 of defect pixels, and this cluster 453 exceeds one or more of the height limit H and the width limit W. FIG. 4D illustrates the cluster 453 of FIG. 4C after the cluster 453 was recursively split into smaller clusters 453.

Figure 6:
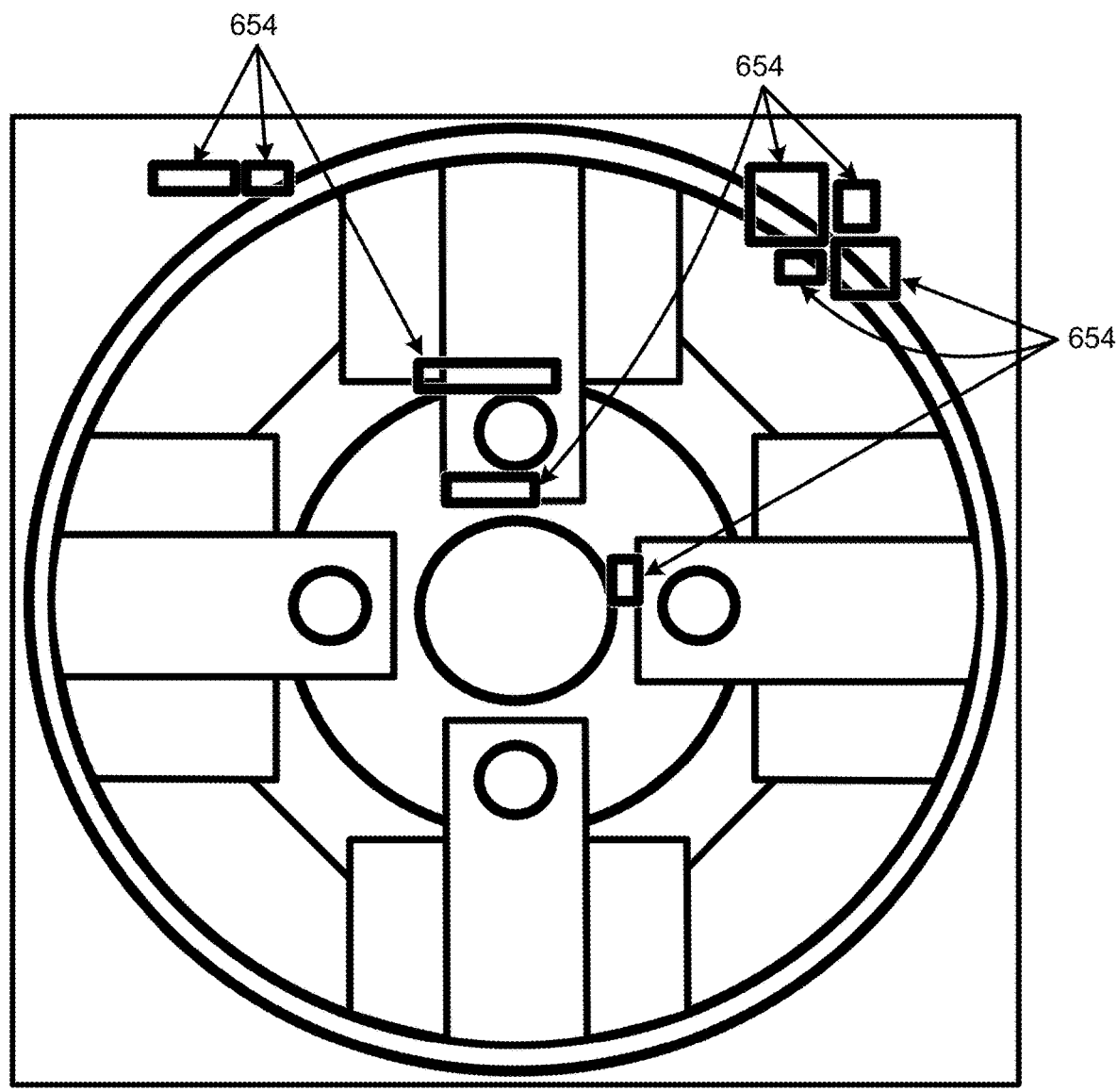
FIG. 6 illustrates an example embodiment of an image that includes bounding boxes that were generated based on the clusters in FIGS. 4B and 4D.

FIG. 6 illustrates an example embodiment of an image that includes bounding boxes that were generated based on the clusters 453 in FIGS. 4B and 4D. FIG. 6 includes bounding boxes 654 for the four clusters 453 in FIG. 4D (which were generated from the cluster 453 in FIG. 4C) and includes bounding boxes for another four clusters 453 in FIG. 4B that are not included in FIGS. 4C-D. Note that the top-left cluster 453 in FIG. 4B has been split into two clusters in FIG. 6. Thus, while FIG. 4B includes five clusters, FIG. 6 includes nine clusters and bounding boxes.

Figure 7:
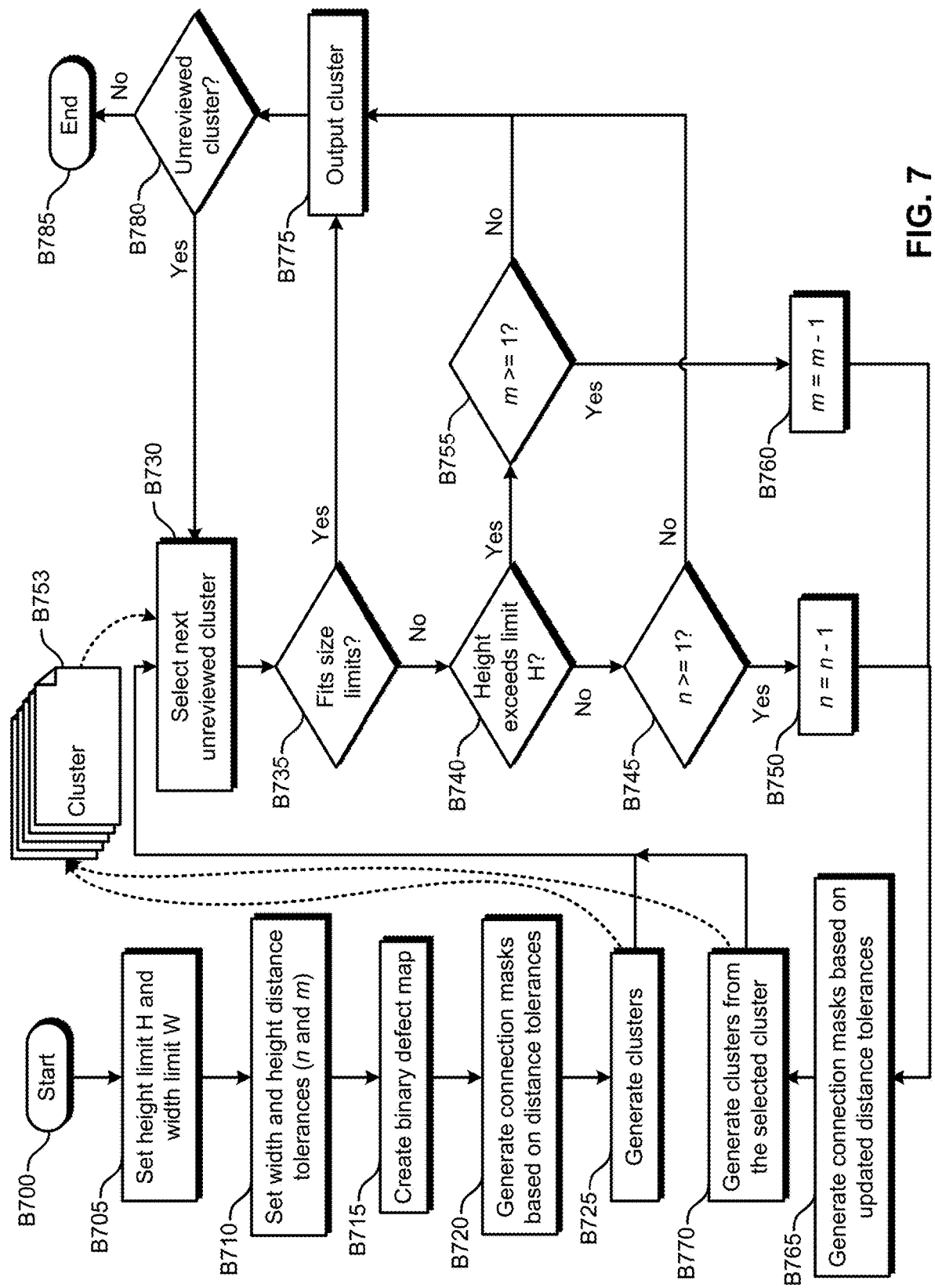
FIG. 7 illustrates an example embodiment of an operational flow for anomaly clustering.

FIG. 7 illustrates an example embodiment of an operational flow for anomaly clustering. The flow starts in block B700 and then moves to block B705, where a clustering device sets a height limit H and a width limit W. Next, in block B710, the clustering device sets a width distance tolerance n and a height distance tolerance m.

The flow then moves to block B715, where the clustering device creates a binary defect map from an anomaly-score image. Then, in block B720, the clustering device generates connection masks in the binary defect map based on the width distance tolerance n and on the height distance tolerance m. The flow then moves to block B725, where the clustering device generates one or more clusters 753 and respective bounding boxes based on the connection masks. When the one or more clusters 753 are output by block B725, all of the clusters 753 are unreviewed clusters.

The flow proceeds to block B730, where the clustering device selects the next unreviewed cluster and its respective bounding box (in the first iteration of block B730, the next unreviewed cluster will be a first cluster). Then, in block B735, the clustering device determines if the bounding box of the selected cluster fits the size limits (the height limit H and the width limit W). If the bounding box does not fit the size limits (B735=No), then the flow moves to block B740. If the bounding box does fit the size limits (B735=Yes), then the flow proceeds to block B775.

In block B740, the clustering device determines if the height of the bounding box exceeds the height limit H. If the height exceeds the height limit H (B740=Yes), then the flow moves to block B755. If the height does not exceed the height limit H (B740=No), this indicates that the width exceeds the width limit W, and the flow proceeds to block B745.

In block B745, the clustering device determines if the width tolerance n is greater than or equal to one (if n≥1). If the width tolerance n is greater than or equal to one (B745=Yes), then the flow moves to block B750. If the width tolerance n is not greater than or equal to one (B745=No), which may indicate that the anomaly region is contiguous, then the flow moves to block B775. In block B750, the clustering device decreases the width tolerance n by one (n=n−1), and then the flow moves to block B765.

In block B755, the clustering device determines if the height tolerance m is greater than or equal to one (if m≥1). If the height tolerance m is greater than or equal to one (B755=Yes), then the flow moves to block B760. If the height tolerance m is not greater than or equal to one (B755=No), which may indicate that the anomaly region is contiguous, then the flow moves to block B775. In block B760, the clustering device decreases the height tolerance m by one (m=m−1), and then the flow moves to block B765.

In block B765, the clustering device generates one or more new connection masks for the defect pixels in the selected cluster based on the updated distance tolerance (either the width distance tolerance n or the height distance tolerance m). Next, in block B770, the clustering device generates one or more new clusters 753 (which are unreviewed clusters when output by block B770) and respective bounding boxes from the defect pixels in the selected cluster (from block B730) based on the new connection masks. Also, in block B770 the clustering device may discard the selected cluster and its bounding box. The flow then returns to block B730.

In block B775, the clustering device outputs or saves the selected cluster, and the clustering device changes the status of the selected cluster to reviewed. The flow then proceeds to block B780, where the clustering device determines if any unreviewed cluster remains. If any of the clusters 753 is still unreviewed (B780=Yes), then the flow returns to block B730. If all of the clusters have been reviewed (B780=No), then the flow moves to block B785, where the flow ends.

Figure 8:
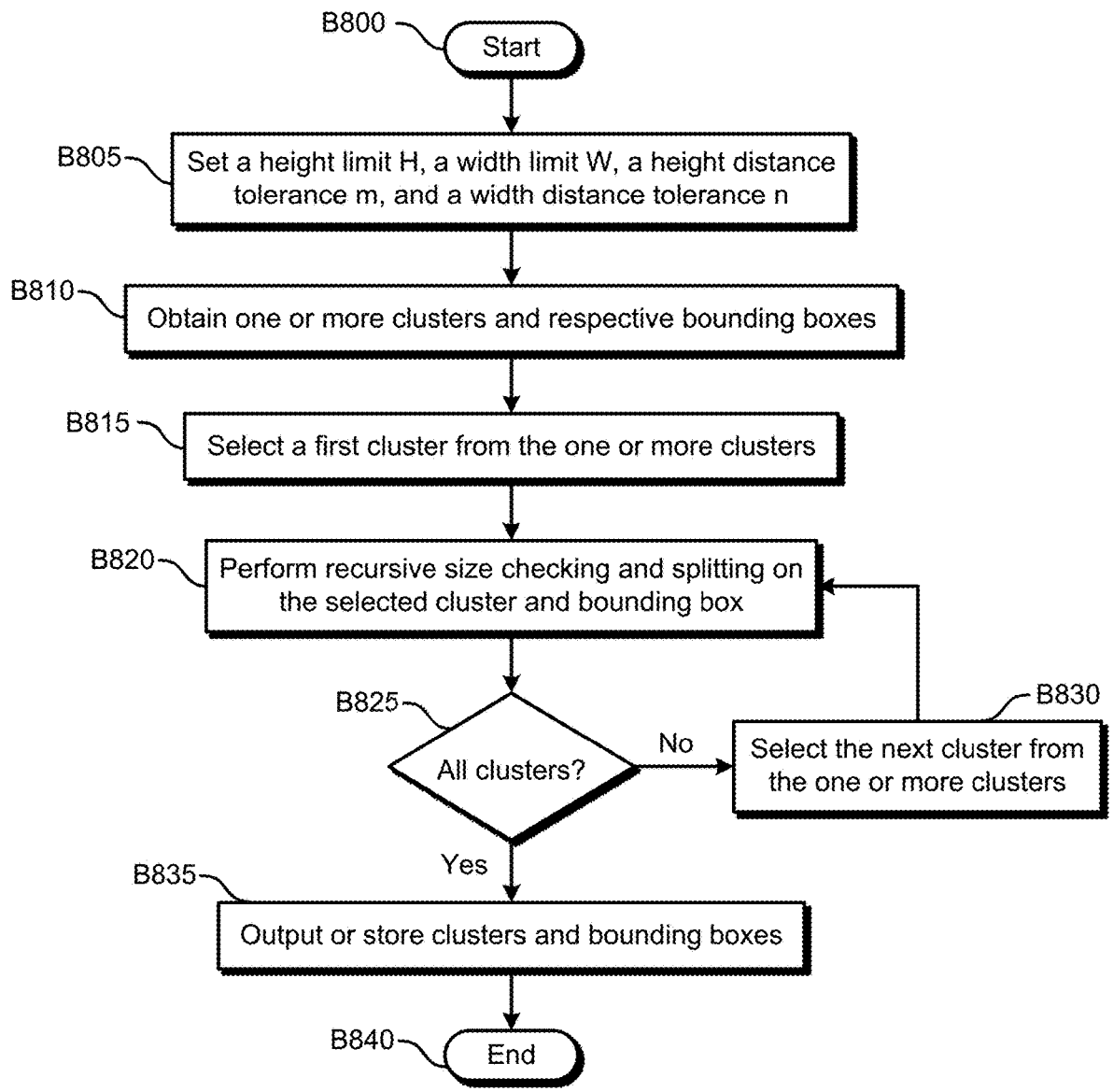
FIG. 8 illustrates an example embodiment of an operational flow for anomaly clustering.

FIG. 8 illustrates an example embodiment of an operational flow for anomaly clustering. The flow starts in block B800 and moves to block B805, where a clustering device sets a height limit H, a width limit W, a height distance tolerance m, and a width distance tolerance n.

Next, in block B810, the clustering device obtains (e.g., generates) one or more clusters and respective bounding boxes from a binary defect map. For example, in some embodiments where the clustering device generates the one or more clusters and their bounding boxes from a binary defect map, the clustering device may generate the one or more clusters and their bounding boxes as described in blocks B305-B320 in FIG. 3. Then, in block B815, the clustering device selects a first cluster from the one or more clusters. The flow then moves to block B820, where the clustering device performs recursive size checking and splitting on the selected cluster and bounding box, for example as described in FIG. 9.

The flow then moves to block B825, where the clustering device determines if block B820 has been performed for every cluster of the one or more clusters. If the clustering device determines that block B820 has not been performed for every cluster of the one or more clusters (B825=No), then the flow moves to block B830. If the clustering device determines that block B820 has been performed for every cluster of the one or more clusters (B825=Yes), then the flow moves to block B835.

In block B830, the clustering device selects the next cluster from the one or more clusters, and the flow returns to block B820.

In block B835, the clustering device outputs or stores the clusters and the bounding boxes (e.g., the information of the defect pixels, the clusters, and the bounding boxes). Then the flow ends in block B840.

Figure 9:
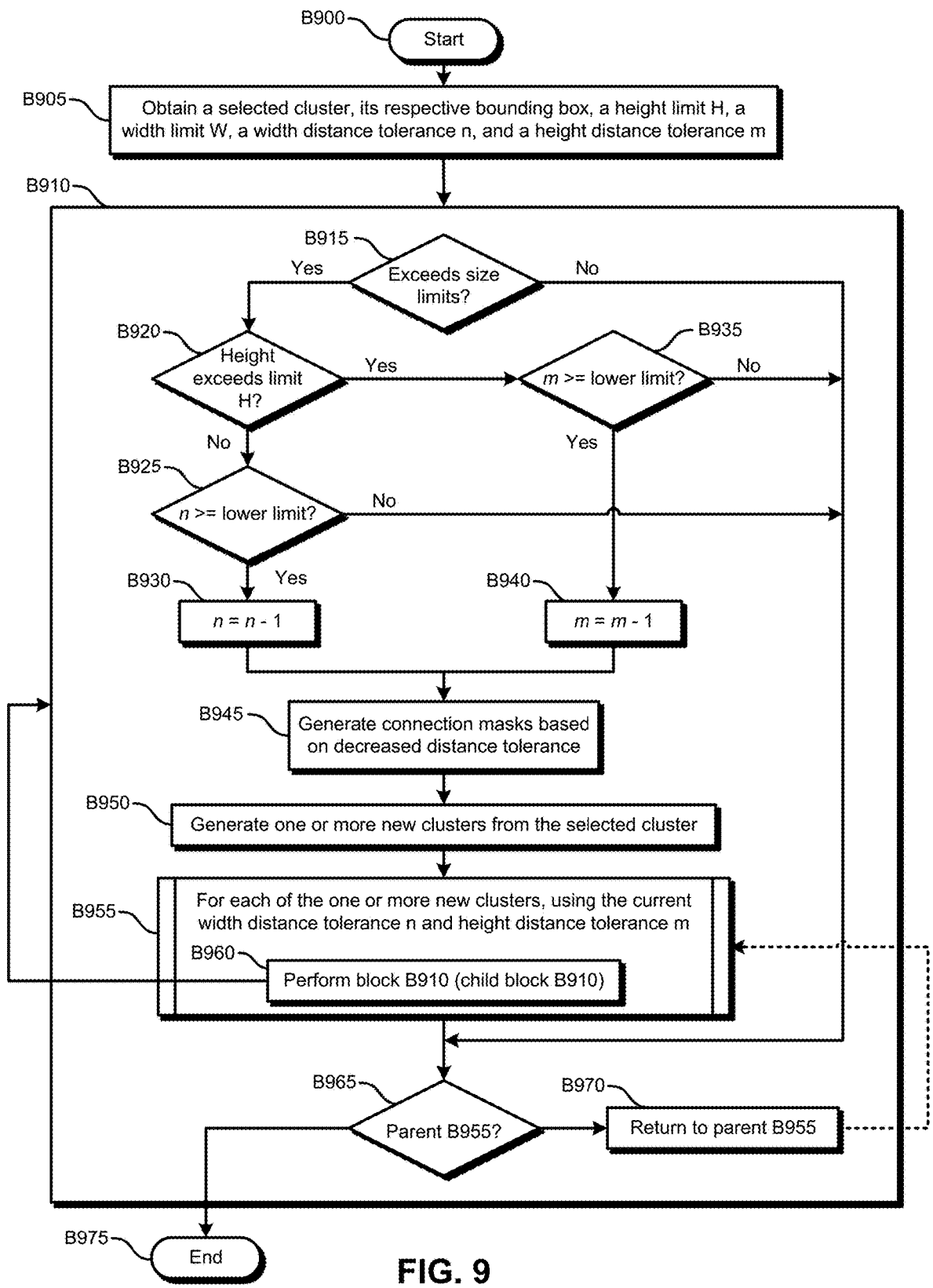
FIG. 9 illustrates an example embodiment of an operational flow for cluster size checking and splitting.

FIG. 9 illustrates an example embodiment of an operational flow for cluster size checking and splitting. The flow starts in block B900 (e.g., in response to the start of block B820 in FIG. 8), and then the flow moves to block B905. In block B905, the clustering device obtains a selected cluster, its respective bounding box, a height limit H, a width limit W, a width distance tolerance n, and a height distance tolerance m. The flow then proceeds to block B910, in which the clustering device performs blocks B915-B960.

In block B915, the clustering device determines if the bounding box exceeds either the height limit H or the width limit W. If the clustering device determines that the bounding box does not exceed the height limit H and does not exceed the width limit W (B915=No), then the flow moves to block B965. If the clustering device determines that the bounding box exceeds the height limit H or exceeds the width limit W (B915=Yes), then the flow moves to block B920.

In block B920, the clustering device determines if the height of the bounding box exceeds the height limit H. If the height exceeds the height limit H (B920=Yes), then the flow moves to block B935. If the height does not exceed the height limit H (B920=No), this indicates that the width exceeds the width limit W, and the flow proceeds to block B925.

In block B925, the clustering device determines if the width tolerance n is greater than or equal to a lower limit. In some embodiments, the lower limit is one, and thus the clustering device determines if the width tolerance n is greater than or equal to one (if n≥1). If the width tolerance n is greater than or equal to the lower limit (B925=Yes), then the flow moves to block B930. If the width tolerance n is not greater than or equal to the lower limit (B925=No), which may indicate that the anomaly region is contiguous, then the flow moves to block B965.

In block B930, the clustering device decreases the width tolerance n by one (n=n−1), and then the flow moves to block B945.

In block B935, the clustering device determines if the height tolerance m is greater than or equal to a lower limit. In some embodiments, the lower limit is one, and thus the clustering device determines if the height tolerance m is greater than or equal to one (if m≥1). If the height tolerance m is greater than or equal to the lower limit (B935=Yes), then the flow moves to block B940. If the height tolerance m is not greater than or equal to the lower limit (B935=No), which may indicate that the anomaly region is contiguous, then the flow moves to block B965.

In block B940, the clustering device decreases the height tolerance m by one (m=m−1), and then the flow moves to block B945.

In block B945, the clustering device generates one or more connection masks for the defect pixels in the selected cluster based on the distance tolerances (n and m), at least one of which has been decreased (either in block B930 or B940). Next, in block B950, the clustering device generates one or more new clusters from the defect pixels in the selected cluster based on the one or more connection masks that were generated in block B945. In block B950, to generate the one or more new clusters, the clustering device may generate one or more new groups of connected components.

The flow then moves to block B955. In block B955, the detection device performs block B960 for each of the one or more new clusters, using the width distance tolerance n and the height distance tolerance m from block B945. In block B960, the clustering device performs block B910 on a new cluster. A block B910 that is performed in a block B960 may be referred to herein as a child block B910, the block B955 in which the child block B910 is performed (in a block B960) may be referred to herein as a parent block B955, and the block B910 in which the child block B910 is performed (in a block B960) may be referred to herein as a parent block B910.

After block B955, the flow moves to block B965, where the clustering device determines if there is a parent block B955 (or parent block B910) of the current block B910. If there is a parent block B955 (or parent block B910) (B965=Yes), then the flow moves to block B970, where the clustering device returns the flow to the parent block B955. If there is not a parent block B955 (B965=No), then the flow ends in block B975.

Thus, blocks B910-B970 are iteratively (e.g., recursively) performed, and each child block B910 starts with either a smaller width distance tolerance n or a smaller height distance tolerance m that its parent block B955 started with. Also, block B910 is performed on each cluster that is generated in an instance of block B950. And some of the clusters that are generated in an instance of block B950 may not be split, and some clusters that are generated in an instance of block B950 may be further split into smaller clusters.

Figure 10:
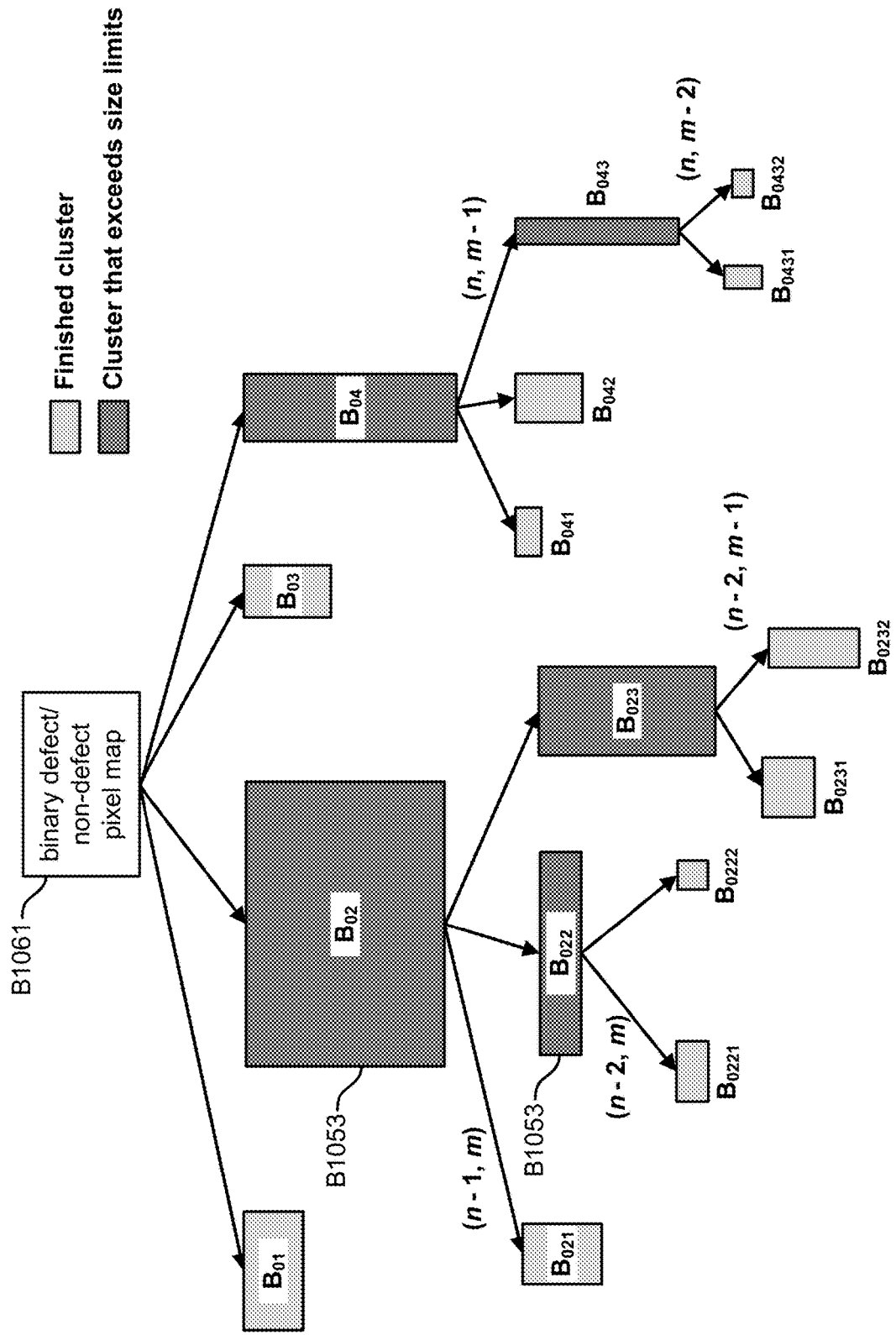
FIG. 10 illustrates example embodiments of clusters that were generated by iterative (e.g., recursive) shrinking and splitting operations.

For example, FIG. 10 illustrates example embodiments of clusters that were generated by iterative (e.g., recursive) shrinking and splitting operations. Clusters $B_{01}$-$B_{04}$ were generated from a binary defect map 1061 using a width distance tolerance n and a height distance tolerance m. Clusters $B_{01}$ and $B_{03}$ satisfied the cluster size limits, and are thus finished clusters. However, clusters $B_{02}$ and $B_{04}$ exceeded one or both of the height limit H and the width limit W.

Cluster $B_{02}$, which exceeded both the height limit H and the width limit W, was split into clusters $B_{021}$-$B_{023}$ after decreasing the width distance tolerance n to n−1. Cluster $B_{021}$ satisfied the cluster size limits, and accordingly was not split any further. However, clusters $B_{022}$-$B_{023}$ exceeded one or both of the height limit H and the width limit W. Thus, cluster $B_{022}$, which exceeded the width limit W, was split into clusters $B_{0221}$-$B_{0222}$ after decreasing the width distance tolerance from n−1 to n−2. Also, cluster $B_{023}$, which exceeded both the width limit W and the height limit H, was split into clusters $B_{0231}$-$B_{0232}$ after decreasing the width distance tolerance from n−1 to n−2 and after decreasing the height distance tolerance from m to m−1. Because clusters $B_{0221}$-$B_{0222}$ and $B_{0231}$-$B_{0232}$ satisfied the size limits, these clusters were finished clusters, which were not split further.

Additionally, cluster $B_{04}$, which exceeded the height limit H, was split into clusters $B_{041}$-$B_{043}$ after decreasing the height distance tolerance m to m−1. Clusters $B_{041}$-$B_{042}$ satisfied the cluster size limits, and accordingly were not split any further. However, cluster $B_{043}$ exceeded the height limit H and was consequently split into clusters $B_{0431}$-$B_{0432}$ after decreasing the height distance tolerance from m−1 to m−2. Because clusters $B_{0431}$-$B_{0432}$ satisfied the cluster size limits, they were not split further.

Figure 11A:
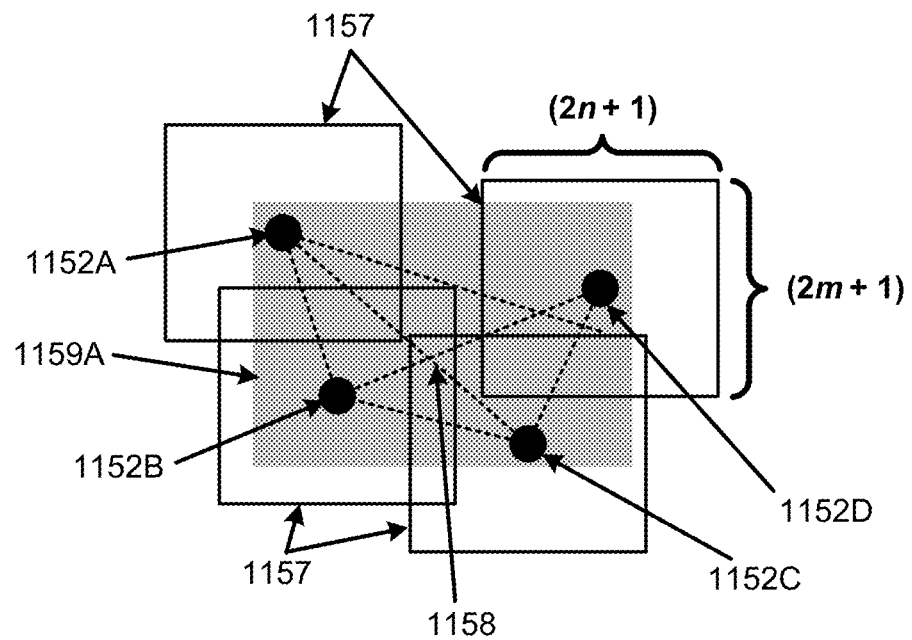
FIGS. 11A-B illustrate example embodiments of connection masks, groups of connected components, clusters, and bounding boxes.
Figure 11B:
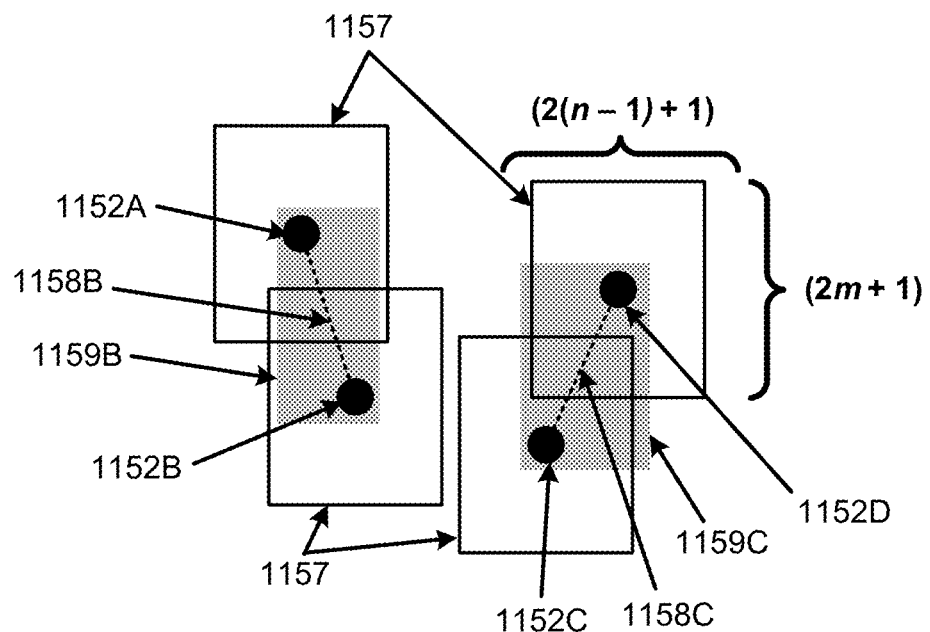

FIGS. 11A-B illustrate example embodiments of connection masks, groups of connected components, and bounding boxes. In FIG. 11A, each of the defect pixels 1152A-C (collectively defect pixels 1152) has a respective connection mask 1157 that is centered on the respective one of the defect pixels 1152. The height distance tolerance is 2m+1, and the width distance tolerance is 2n+1. Although the connection mask 1157 of the first defect pixel 1152A overlaps only the connection mask 1157 of the second defect pixel 1152B, and the connection mask 1157 of the fourth defect pixel 1152D overlaps only the connection mask of the third defect pixel 1152C, the four pixels 1152 all belong to the same group of connected components 1158A because the connection mask 1157 of the second pixel 1152B overlaps the connection mask 1157 of the third defect pixel 1152C.

Thus, the four pixels 1152 are clustered into the same cluster and surrounded by the same bounding box 1159A.

FIG. 11B shows the connection masks, groups of connected components, and bounding boxes of the pixels that are shown in FIG. 11A after the width distance tolerance was decreased from 2n+1 to 2(n−1)+1. After the decrease, the connection mask 1157 of the first pixel 1152A still overlaps the connection mask 1157 of the second pixel 1152B, and the connection mask 1157 of the third pixel 1152C still overlaps the connection mask 1157 of the fourth pixel 1152D. However, the connection mask 1157 of the second pixel 1152B no longer overlaps the connection mask 1157 of the third pixel 1152C. Thus, the first pixel 1152A and the second pixel 1152B are added to one groups of connected components 1158B and are clustered together, and the third pixel 1152C and the fourth pixel 1152D are added to another group of connected components 1158C and clustered together. Also, a first bounding box 1159B surrounds the first pixel 1152A and the second pixel 1152B, and a second bounding box 1159C surrounds the third pixel 1152C and the fourth pixel 1152D.

Figure 12:
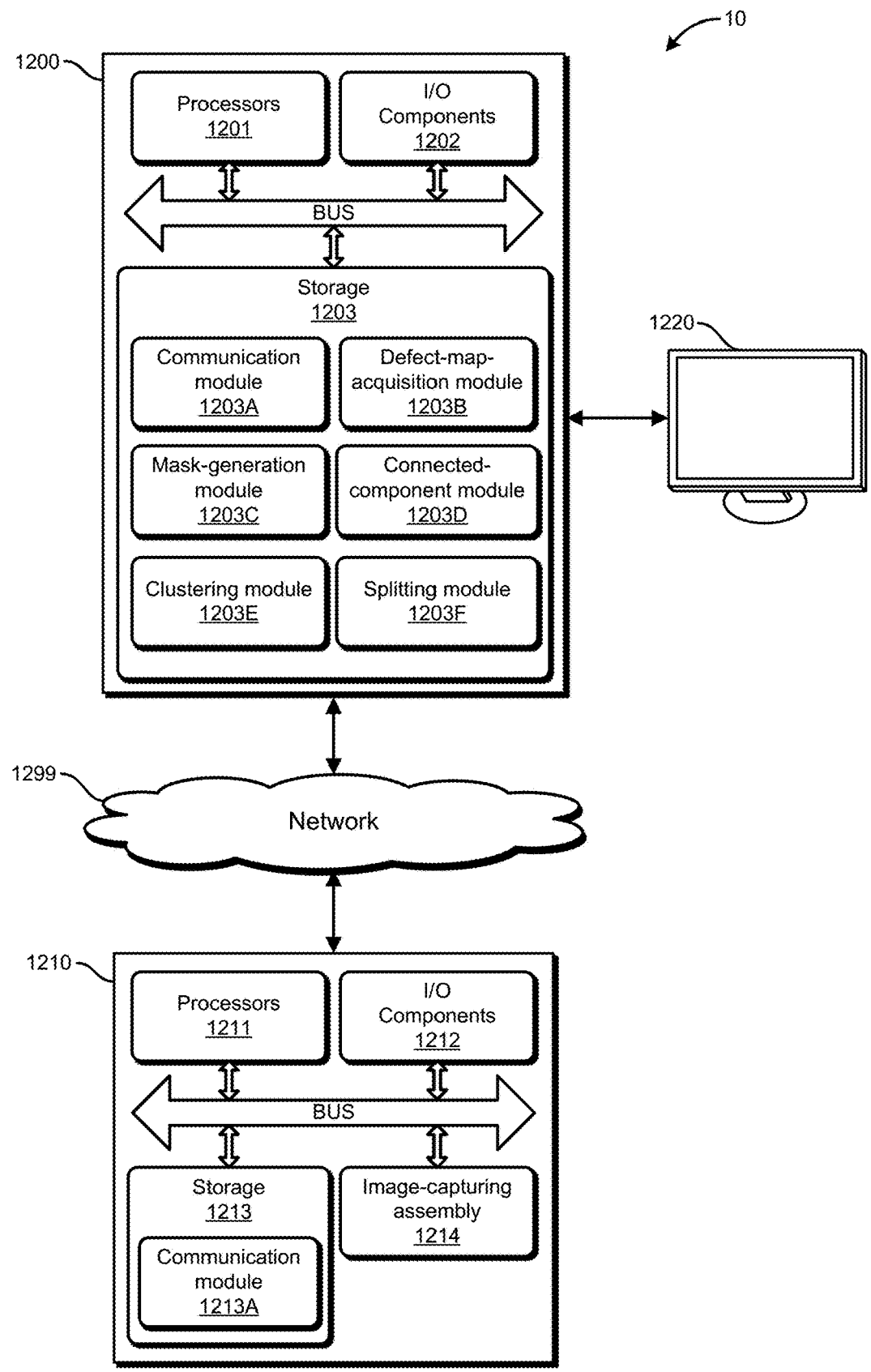
FIG. 12 illustrates an example embodiment of a system for anomaly clustering.

FIG. 12 illustrates an example embodiment of a system for anomaly clustering. The system 10 includes a clustering device 1200, which is a specially-configured computing device; an image-capturing device 1210; and a display device 1220. In this embodiment, the clustering device 1200 and the image-capturing device 1210 communicate via one or more networks 1299, which may include a wired network, a wireless network, a LAN, a WAN, a MAN, and a PAN. Also, in some embodiments the devices communicate via other wired or wireless channels.

The clustering device 1200 includes one or more processors 1201, one or more I/O components 1202, and storage 1203. Also, the hardware components of the clustering device 1200 communicate via one or more buses or other electrical connections. Examples of buses include a universal serial bus (USB), an IEEE 1394 bus, a Peripheral Component Interconnect (PCI) bus, a Peripheral Component Interconnect Express (PCIe) bus, an Accelerated Graphics Port (AGP) bus, a Serial AT Attachment (SATA) bus, and a Small Computer System Interface (SCSI) bus.

The one or more processors 1201 include one or more central processing units (CPUs), which may include microprocessors (e.g., a single core microprocessor, a multi-core microprocessor); one or more graphics processing units (GPUs); one or more tensor processing units (TPUs); one or more application-specific integrated circuits (ASICs); one or more field-programmable-gate arrays (FPGAs); one or more digital signal processors (DSPs); or other electronic circuitry (e.g., other integrated circuits). The I/O components 1202 include communication components (e.g., a GPU, a network-interface controller) that communicate with the display device 1220, the network 1299, the image-capturing device 1210, and other input or output devices (not illustrated), which may include a keyboard, a mouse, a printing device, a touch screen, a light pen, an optical-storage device, a scanner, a microphone, a drive, and a controller (e.g., a joystick, a control pad).

The storage 1203 includes one or more computer-readable storage media. A computer-readable storage medium includes an article of manufacture, for example a magnetic disk (e.g., a floppy disk, a hard disk), an optical disc (e.g., a CD, a DVD, a Blu-ray), a magneto-optical disk, magnetic tape, and semiconductor memory (e.g., a non-volatile memory card, flash memory, a solid-state drive, SRAM, DRAM, EPROM, EEPROM). The storage 1203, which may include both ROM and RAM, can store computer-readable data or computer-executable instructions.

The clustering device 1200 also includes a communication module 1203A, a defect-map-acquisition module 1203B, a mask-generation module 1203C, a connected-component module 1203D, a clustering module 1203E, and a splitting module 1203F. A module includes logic, computer-readable data, or computer-executable instructions. In the embodiment shown in FIG. 12, the modules are implemented in software (e.g., Assembly, C, C++, C#, Java, BASIC, Perl, Visual Basic, Python). However, in some embodiments, the modules are implemented in hardware (e.g., customized circuitry) or, alternatively, a combination of software and hardware. When the modules are implemented, at least in part, in software, then the software can be stored in the storage 1203. Also, in some embodiments, the clustering device 1200 includes additional or fewer modules, the modules are combined into fewer modules, or the modules are divided into more modules.

The communication module 1203A includes instructions that cause the clustering device 1200 to communicate with one or more other devices (e.g., the image-capturing device 1210, the display device 1220), for example to obtain one or more images from the other devices, to display images or other information on the other devices, to obtain anomaly scores from another device, or to output clusters and bounding boxes. Some embodiments of the communication module 1203A include instructions that cause the clustering device 1200 to perform at least some of the operations that are described in blocks B305 and B350 in FIG. 3, in block B775 in FIG. 7, or in blocks B810 and B835 in FIG. 8.

The defect-map-acquisition module 1203B includes instructions that cause the clustering device 1200 to obtain a binary defect map, for example by obtaining an anomaly-score image and generating a binary defect map from the anomaly score image, by retrieving a binary defect map from storage, or by retrieving a binary defect map from another device. Some embodiments of the defect-map-acquisition module 1203B includes instructions that cause the clustering device 1200 to perform at least some of the operations that are described in block B305 in FIG. 3 or in block B715 in FIG. 7.

The mask-generation module 1203C includes instructions that cause the clustering device 1200 to generate a respective connection mask at each defect detection location (e.g., each pixel's location) in a binary defect map based on a width distance tolerance and on a height distance tolerance. Some embodiments of the mask-generation module 1203C include instructions that cause the clustering device 1200 to perform at least some of the operations that are described in blocks B310 and B340 in FIG. 3, in blocks B720 and B765 in FIG. 7, or in block B945 in FIG. 9.

The connected-component module 1203D includes instructions that cause the clustering device 1200 to label connected components (e.g., detection locations that have overlapping connection masks) in defect/non-defect maps based on connection masks. Some embodiments of the connected-component module 1203D include instructions that cause the clustering device 1200 to perform at least some of the operations that are described in blocks B315 and B345 in FIG. 3, in blocks B725 and B770 in FIG. 7, or in block B950 in FIG. 9.

The clustering module 1203E includes instructions that cause the clustering device 1200 to obtain (e.g., generate) clusters and their respective bounding boxes. Some embodiments of the clustering module 1203E include instructions that cause the clustering device 1200 to perform at least some of the operations that are described in blocks B320 and B350 in FIG. 3, in blocks B725 and B770 in FIG. 7, in block B810 in FIG. 8, or in block B950 in FIG. 9.

The splitting module 1203F includes instructions that cause the clustering device 1200 to split clusters that have bounding boxes that exceed the size limits into smaller clusters. Also, splitting module 1203F may call one or more of the mask-generation module 1203C, the connected-component module 1203D, and the clustering module 1203E. Thus, some embodiments of the splitting module 1203F (e.g., some embodiments that call the mask-generation module 1203C, the connected-component module 1203D, and the clustering module 1203E) include instructions that cause the clustering device 1200 to perform the operations that are described in block B325 in FIG. 3 (which includes blocks B330-B350), in blocks B730-B780 in FIG. 7, in blocks B815-B830 in FIG. 8, or in blocks B905 and B910 (which includes blocks B915-B970) in FIG. 9.

The image-capturing device 1210 includes one or more processors 1211, one or more I/O components 1212, storage 1213, a communication module 1213A, and an image-capturing assembly 1214. The image-capturing assembly 1214 includes one or more image sensors and may include one or more lenses and an aperture. The communication module 1213A includes instructions that, when executed, or circuits that, when activated, cause the image-capturing device 1210 to capture an image, receive a request for an image from a requesting device, retrieve a requested image from the storage 1213, or send a retrieved image to the requesting device (e.g., the clustering device 1200).

Also, in some embodiments, the clustering device 1200 includes the image-capturing assembly 1214. And some embodiments of the clustering device 1200 include one or more modules that include instructions that cause the clustering device 1200 to obtain in image, generate anomaly scores for the areas (e.g., pixels) in the image, and generate a binary defect map based on the anomaly scores.

Thus, some embodiments of the devices, systems, and methods can cluster defect pixels based on their locations (the total number of clusters does not need to be pre-defined), separately set size limits in width and height, and start with larger clusters and split them only if they exceed the size limit (may speed up the clustering process). In the outputs, every one defect pixel belongs to a cluster. The final bounding box of the cluster is smaller than the size limit unless the cluster is a contiguous defect cluster.

The distance between the defect pixels and the maximal allowed distance can be separately set on the x and y axes. And, if any of the initial clusters is larger than a size limit, shrinking and splitting operations are performed on this cluster until all the defect pixels belong to a cluster that is smaller than the size limit or until the defect area is defined as a contiguous defect. The shrinking and splitting operations are performed on the x axis or the y axis, depending on which dimension of the cluster is larger than the size limit. Also, the operations may be performed recursively.

At least some of the above-described devices, systems, and methods can be implemented, at least in part, by providing one or more computer-readable media that contain computer-executable instructions for realizing the above-described operations to one or more computing devices that are configured to read and execute the computer-executable instructions. The systems or devices perform the operations of the above-described embodiments when executing the computer-executable instructions. Also, an operating system on the one or more systems or devices may implement at least some of the operations of the above-described embodiments.

Furthermore, some embodiments use one or more functional units to implement the above-described devices, systems, and methods. The functional units may be implemented in only hardware (e.g., customized circuitry) or in a combination of software and hardware (e.g., a microprocessor that executes software).

Additionally, some embodiments combine features from two or more of the previously described embodiments. Also, as used herein, the conjunction "or" generally refers to an inclusive "or," though "or" may refer to an exclusive "or" if expressly indicated or if the context indicates that the "or" must be an exclusive "or."

The invention claimed is:

1. A device comprising:
one or more computer-readable storage media; and
one or more processors that are configured to cause the device to perform operations including:
generating a respective connection mask at each defect detection location in a binary defect map, wherein each detection location in the binary defect map has a value that indicates that the detection location either has a defect or, alternatively, does not have a defect;
generating one or more clusters of defect detection locations in the binary defect map based on each defect detection location's respective connection mask and on the binary defect map;
generating respective bounding boxes for the one or more clusters; and
recursively performing:
checking respective dimensions of the bounding boxes, and
splitting any clusters of the one or more clusters that have respective bounding boxes with respective dimensions that exceed one or more thresholds, thereby generating additional clusters of defect detection locations, wherein the respective dimensions that exceed the one or more thresholds include width or height.

2. The device of claim 1, wherein splitting a cluster of the one or more clusters that have respective bounding boxes with respective dimensions that exceed the one or more thresholds includes decreasing a width distance tolerance or a height distance tolerance of the connection masks of the defect detection locations in the cluster.

3. The device of claim 2, wherein splitting the cluster of the one or more clusters that have respective bounding boxes with respective dimensions that exceed the one or more thresholds includes generating one or more new clusters of the defect detection locations in the cluster based on the connection masks of the defect detection locations in the cluster after decreasing the width distance tolerance or the height distance tolerance of the connection masks.

4. The device of claim 1, where each detection location is a pixel.

5. The device of claim 1, wherein the operations further include:
displaying the bounding boxes on an image of an object, wherein the bounding boxes are superimposed on the image.

6. A method comprising:
obtaining a defect map, wherein each detection location in the defect map has either a value that indicates that the detection location has a defect or, alternatively, a value that indicates that the detection location does not have a defect;

generating a respective connection mask at each detection location in the defect map;

generating one or more clusters of defect detection locations in the defect map based on each defect detection location's respective connection mask and on the binary defect map;

generating a respective bounding box for each of the one or more clusters of defect detection locations;

identifying a bounding box of the respective bounding boxes that exceeds a size threshold;

decreasing a distance tolerance of the connection masks of the defect detection locations in the cluster that corresponds to the bounding box, thereby generating first smaller connection masks;

generating one or more first additional clusters of defect detection locations from the defect detection locations in the cluster that corresponds to the bounding box based on the first smaller connection masks; and generating a respective first bounding box for each of the one or more first additional clusters of defect detection locations.

7. The method of claim 6, further comprising:

identifying a first bounding box of the respective first bounding boxes that exceeds the size threshold;

further decreasing the distance tolerance of the connection masks of the defect detection locations in the first additional cluster that corresponds to the first bounding box, thereby generating second smaller connection masks;

generating one or more second additional clusters of defect detection locations from the defect detection locations in the first additional cluster that corresponds to the first bounding box based on the second smaller connection masks; and generating a respective second bounding box for each of the one or more second additional clusters of defect detection locations.

8. The method of claim 6, wherein each detection location is a respective patch.

9. The method of claim 6, wherein each detection location is a respective pixel.

10. The method of claim 6, wherein the size threshold is a width threshold or a height threshold.

11. The method of claim 6, wherein generating one or more clusters of defect detection locations in the defect map based on each defect detection location's respective connection mask and on the binary defect map includes:

adding defect detection locations to a cluster if the respective connection masks of the defect detection locations overlap.

12. The method of claim 11, wherein generating one or more clusters of defect detection locations in the defect map based on each defect detection location's respective connection mask and on the binary defect map includes:

adding defect detection locations to the cluster if the respective connection masks of the defect detection locations overlap at least one connection mask of the defect detection locations in the cluster.

13. The method of claim 6, wherein the defect map is a binary defect map.

14. The method of claim 13, further comprising:

generating the defect map from an anomaly-score image.

15. One or more computer-readable storage media storing instructions that, when executed by one or more computing devices, cause the one or more computing devices to perform operations comprising:

generating a respective connection mask at each defect detection location in a binary defect map, wherein each detection location in the binary defect map has a value that indicates that the detection location either has a defect or, alternatively, does not have a defect;

generating one or more clusters of defect detection locations in the binary defect map based on each defect detection location's respective connection mask and on the binary defect map;

generating respective bounding boxes for the one or more clusters; and recursively performing:

checking respective dimensions of the bounding boxes, and splitting any clusters of the one or more clusters that have respective bounding boxes with respective dimensions that exceed one or more thresholds, thereby generating additional clusters of defect detection locations, wherein the respective dimensions that exceed the one or more thresholds include width or height.

16. The one or more computer-readable storage media of claim 15, wherein splitting a cluster of the one or more clusters that have respective bounding boxes with respective dimensions that exceed the one or more thresholds includes decreasing a width distance tolerance or a height distance tolerance of the connection masks of the defect detection locations in the cluster.

17. The one or more computer-readable storage media of claim 16, wherein splitting the cluster of the one or more clusters that have respective bounding boxes with respective dimensions that exceed the one or more thresholds includes generating one or more new clusters of the defect detection locations in the cluster based on the connection masks of the defect detection locations in the cluster after decreasing the width distance tolerance or the height distance tolerance of the connection masks.

18. The one or more computer-readable storage media of claim 15, wherein the one or more thresholds include a width threshold and a size threshold.

* * * * *